United States Patent

Rosenblum

[15] 3,646,533

[45] Feb. 29, 1972

[54] ROTARY DISK ASSEMBLY HAVING LOW-DENSITY CORE FOR INFORMATION STORAGE SYSTEM

[72] Inventor: Robert A. Rosenblum, Newbury Park, Calif.

[73] Assignee: Burroughs Corporation, Detroit, Mich.

[22] Filed: Apr. 8, 1969

[21] Appl. No.: 814,384

[52] U.S. Cl. ................340/174.1 R, 179/100.2 A, 274/41.4, 346/137

[51] Int. Cl. ........................................................G11b 5/82

[58] Field of Search ....................179/100.2 A; 274/41.4, 42; 340/174.1; 74/572; 346/137; 29/191.4

[56] References Cited

UNITED STATES PATENTS

| | | | |
|---|---|---|---|
| 3,072,225 | 1/1963 | Cremer et al. | 29/191.4 |
| 3,336,583 | 8/1967 | Comstock | 340/174.1 |
| 3,488,646 | 1/1970 | Sogaya et al. | 179/100.2 |
| 3,037,205 | 5/1962 | Hagopian | 346/74 MD |
| 3,130,110 | 4/1964 | Schmidt | 346/74 MD |

*Primary Examiner*—Terrell W. Fears
*Assistant Examiner*—Vincet P. Canney
*Attorney*—Christie, Parker & Hale

[57] ABSTRACT

In a disk file information storage system, the rotary disk is constructed of a low-density core covered with a thin higher density outer skin. The core is preferably a honeycomb structure with cells whose axes are parallel to the axis of the disk. The skin is constructed of flat circular sheets of metal bonded to the ends of the core and an outer ring bonded to the sheets along the outside perimeter of the core. Assuming the core has a hole through its center, the skin includes an inner ring bonded to the sheets along the inside perimeter of the core. Thus, the core is sealed by the skin.

15 Claims, 4 Drawing Figures

INVENTOR.
ROBERT A. ROSENBLUM
BY
Christie, Parker & Hale
ATTORNEYS

ROTARY DISK ASSEMBLY HAVING LOW-DENSITY CORE FOR INFORMATION STORAGE SYSTEM

BACKGROUND OF THE INVENTION

This invention relates to the construction of rotary disks and, more particularly, to a rotary disk assembly for an information storage system.

In a disk file information storage system, information is recorded on the magnetic surface of a large homogeneous rotary disk. Access is gained to the magnetic surface by driving the disk so it rotates past a magnetic transducer head situated in close proximity to the magnetic surface. In order to maximize the signal-to-noise ratio of the electrical system, the transducer is placed as close as physically possible to the magnetic surface of the disk without touching it. Thus, one design objective is to reduce the axial vibrations of the disk to the lowest possible level. Unfortunately, some of the other design objectives of a disk file system tend to promote large vibrations in the disk. For example, to increase the storage capacity of the disk it is desirable to make its diameter very large; to gain random access to any area on the disk in the shortest possible time, it is desirable to drive the disk at a high angular velocity; and to reduce the weight and amount of material of the disk, it is desirable to make the disk as thin as possible. These all encourage axial vibrations in the disk.

SUMMARY OF THE INVENTION

The invention contemplates a rotary disk assembly for an information storage system in which a low density core is covered with a thin higher density outer skin. Preferably, the core is a honeycomb structure with cells whose axes are parallel to the axis of the disk. The outer skin, which seals the core, comprises flat, circular sheets of metal bonded to the ends of the core and an outer ring bonded to the sheets along the outside perimeter of the core. The circular sheets are coated with a magnetic material. If it is desired that the disk assembly have a hole through its center, an inner ring is bonded to the sheets along the inside perimeter of the core.

It has been found that a rotary disk assembly of the described construction possesses a resonant frequency parallel to the axis of the disk that is appreciably higher than that of a comparable diameter and weight disk made from a solid homogeneous piece of material. Accordingly, it is possible to drive the rotary disk assembly of the invention at a higher angular velocity without introducing appreciable axial vibrations and a disk having a larger diameter becomes feasible without encountering axial vibrations. Further, the thickness of the disk may be increased without appreciable increase in weight by increasing the core thickness. It has also been found that the surface of the rotary disk assembly of the invention can be made flat and ready to finish without subjecting the disk to stress relief.

BRIEF DESCRIPTION OF THE DRAWING

The features of a specific embodiment of the best mode contemplated of carrying out the invention are illustrated in the drawing, in which.

DETAILED DESCRIPTION OF THE INVENTION

Figures 1, 2, 2A, 3:
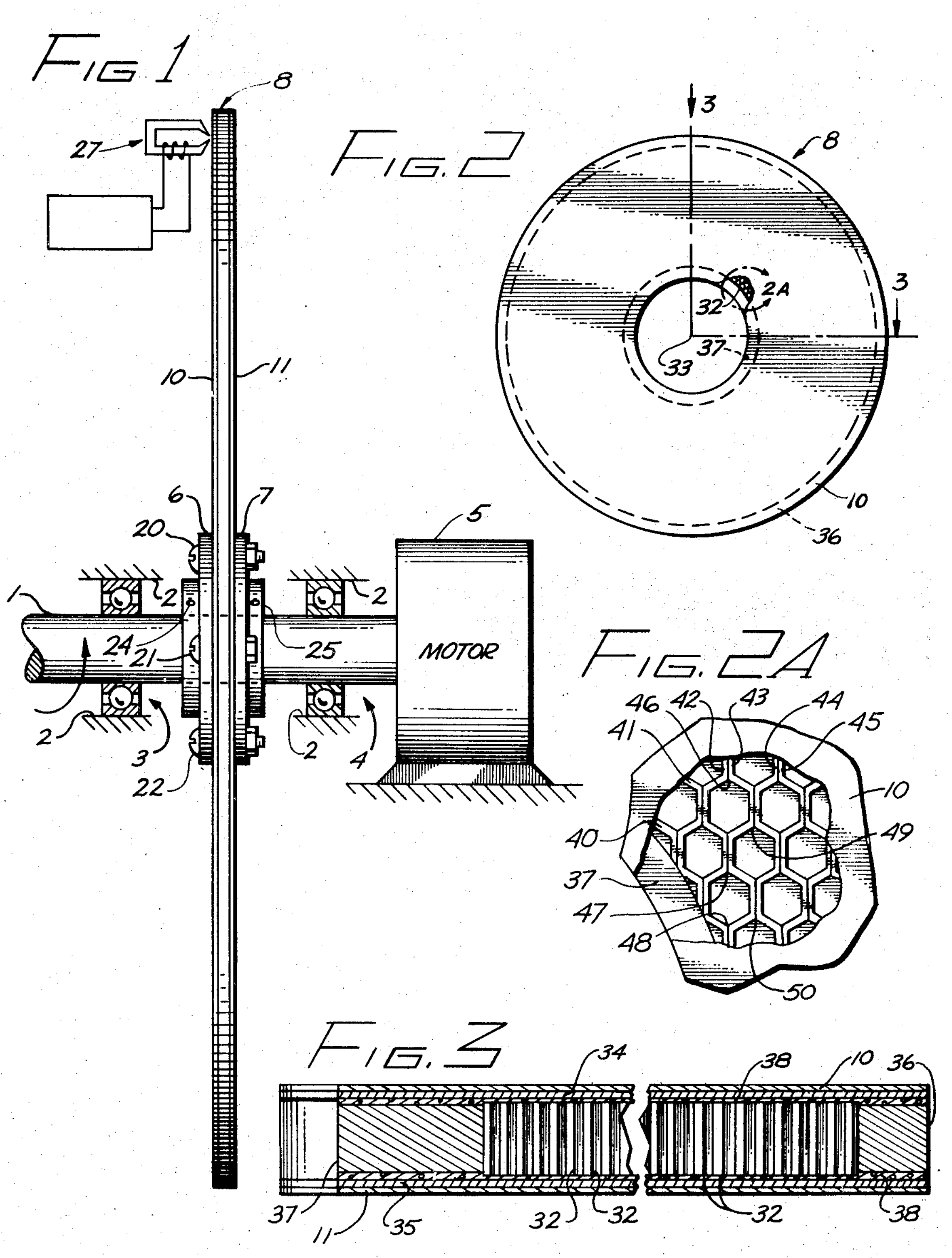
FIG. 1 is a side elevation view of a disk file information storage system.
FIG. 2 is a front elevation view partially in section of the rotary disk assembly of FIG. 1.
FIG. 2A is a partial enlargement of FIG. 2.
FIG. 3 is a partial top view in section of the rotary disk assembly of FIG. 2.

In FIG. 1, a drive shaft 1 is shown that is rotatably supported with respect to a fixed frame 2 by bearings 3 and 4. Shaft 1 is coupled to a motor 5. Circular hubs 6 and 7 are mounted on shaft 1. A circular disk assembly 8 is mounted on shaft 1 between hubs 6 and 7. Assembly 8 has coatings 10 and 11 of magnetic material such as cobalt-nickle to enable it to store information. Hubs 6 and 7 and assembly 8 all have through their centers holes with a slightly larger diameter than shaft 1 so a good fit results when they are mounted on shaft 1.

Hubs 6 and 7 are clamped together by four equally spaced nut and bolt assemblies, three of which are designated 20, 21, and 22 in FIG. 1. Pins 24 and 25 prevent rotation of hubs 6 and 7, respectively, relative to shaft 1. A magnetic transducer head 27 is located in close proximity to one surface of disk assembly 8. Similarly, another magnetic transducer head (not shown) could be placed in close proximity to the other surface of assembly 8.

Reference is made to FIGS. 2, 2A, and 3 for the construction of assembly 8, which comprises a honeycomb core covered with a thin metallic skin. The core is formed from a plurality of short, cylindrical cells 32 having axes that are parallel to one another and to the axis of assembly 8 (represented in FIG. 2 by a point 33). The core is built from very thin, flat sheets of material, preferably aluminum. The sheets are stacked next to each other and adjacent sheets are bonded to each other at spaced-apart intervals. Each sheet is bonded to the sheet on one side of it and is bonded in the spaces between bonds with the sheet on the other side of it. After the sheets are bonded in this manner, they are pulled apart to form cells with approximately hexagonal cross sections, as depicted in FIG. 2A. In FIG. 2A, 40, 41, 42, 43, 44, and 45 represent the sheets; 46, 47 and 48 represent the bonds between sheets 43 and 42; and 49 and 50 represent the bonds between sheets 43 and 44. The skin comprises flat, circular metallic sheets 34 and 35 that respectively cover the ends of the core 30, an outer ring 36 that covers the outside perimeter of the core, and an inner ring 37 that covers the inside perimeter of the core. The diameters of sheets 34 and 35 are larger than that of core by the radial thickness of ring 36. Sheets 34 and 35 have holes through their center that are smaller in diameter than the hole through the core by the radial thickness of ring 37. Sheets 34 and 35 could be made from brass and rings 36 and 37 could be made from aluminum. Sheets 34 and 35 are bonded to core 30 and to rings 36 and 37 by a cement 38 such as epoxy. As a result, core 30 is completely sealed.

Although a honeycomb is preferable, any solid core material that forms a core having a lower density than the skin will provide an improvement over a homogeneous disk. Thus, core 30 could be a foamy mass, e.g., epoxy, or a nonporous mass, e.g., aluminum. "Solid material" as used herein means a material that is not liquid or gas.

Disk assembly 8 can be fabricated in the following manner: First, the honeycomb core is formed by pulling the sheets apart and is cut into a circular configuration having a hole through its center; second, outer ring 36 is fitted around the outside perimeter of core 30 and inner ring 37 is fitted around the inside perimeter of core 30; third, sheets 34 and 35 are placed over the ends of core 30 with sheets of epoxy impregnated fabric sandwiched therebetween; fourth, heat and axial pressure are simultaneously applied to the disk assembly to cause the epoxy to set; fifth, the outer surfaces of sheets 34 and 35 and rings 36 and 37 are lapped to form very flat surfaces for the coatings of magnetic material and to form a smooth, close fitting junction between rings 36 and 37 and the ends of sheets 34 and 35. Finally, the magnetic material is electroplated on sheets 34 and 35. Aluminum does not readily accept a deposit of the magnetic material by electroplating, so rings 36 and 37 are not coated. Since the assembly is sealed, the electroplating bath does not penetrate the skin to the core.

It has been found that a disk assembly of the described construction has a very high resonant frequency parallel to its axis. For example, a disk assembly having an overall thickness of one-half inch, an overall diameter of 26½ inches, and sheets 34 and 35 that are each nominally 0.040 inch can be driven at an angular velocity of over 3,000 revolutions per minute without encountering appreciable axial vibrations. Serious axial vibrations occur in a solid 26½-inch homogeneous brass disk of the same weight at 1,200 revolutions per minute. If the same disk is increased four times in weight to a thickness of one-half inch, there is doubt it would perform as well as the disk assembly construction of the invention because specific stiffness is not increased.

It has also been found that a very flat surface can be produced on the disk assembly without subjecting the assembly to stress relief. The reason for this is believed to be that sheets 34 and 35 are much thinner than the overall thickness of the disk assembly and can be provided in a reasonably flat condition.

Further, it has been found the disk assembly has sufficient concentricity to effect an excellent static and dynamic balance during rotation.

What is claimed:

1. In an information storage system, a rotary disk assembly comprising:
   a low-density core of solid material having a circular configuration, the core comprising a honeycomb structure with cells whose axes are parallel to the axis of the core;
   a thin higher density outer skin covering the core, the outer skin comprising a ring covering the outer perimeter of the core and first and second flat circular sheets of material respectively covering the ends of the core, the sheets of material being bonded to the core and the ring to seal the core; and
   a coating of magnetic material covering at least a portion of the skin.

2. The disc assembly of claim 1, in which the circular configuration of the core defines opposing parallel ends and an outer perimeter, the core is bonded to the sheets over substantially all of each of the opposing ends, and the cells of the honeycomb structure are defined by walls extending between the opposing ends to provide a rigid connection between the sheets over substantially all of each of the sheets.

3. The disk assembly of claim 1, in which the cells have hexagonal cross sections perpendicular to the axis of the core.

4. The disk assembly of claim 3, in which the core has a hole through its center and the skin additionally comprises an inner ring covering the inside perimeter of the core formed by the hole.

5. The disk assembly of claim 4, in which the coatings of magnetic material lie on the outer surfaces of both circular sheets of material.

6. An information storage system comprising:
   a rotatable shaft;
   an integral disk assembly mounted on the shaft to rotate with the shaft, the disk assembly having a circular low-density core of solid material, a higher density outer skin covering the core, the outer skin comprising a ring covering the outside perimeter of the core and a pair of flat circular plates respectively covering the ends of the core, the plates being bonded to the ring, and a coating of magnetic material on the skin;
   a magnetic transducer head situated in close proximity to the magnetic coating on the disk assembly; and
   means for driving the shaft to rotate the disk assembly repeatedly past the transducer head.

7. The information storage system of claim 6, in which the core has a hole through its center and the skin additionally comprises an inner ring covering the inside perimeter of the core formed by the hole.

8. The information storage system of claim 6, in which the core defines opposing parallel ends and an outer perimeter and the core is bonded to the plates over substantially all of each of the opposing ends.

9. The information storage system of claim 8, in which the core has voids running parallel to the axis of the disc assembly to define a rigid structure that extends between the opposing ends to connect the pairs of plates together.

10. The information storage system of claim 6, in which the core is a honeycomb structure with cells whose axes are parallel to the axis of the disk assembly.

11. The information storage system of claim 10, in which the cells have a hexagonal cross section perpendicular to the axis of the disk assembly.

12. The information storage system of claim 11, in which the core has a hole through its center and the skin additionally comprises an inner ring covering the inside perimeter of the core formed by the hole.

13. The information storage system of claim 12, in which the sheets are of any material onto which magnetic material may be deposited.

14. The information storage system of claim 12, in which the sheets are a material such as brass or copper which will readily accept deposit of the magnetic material by electroplating.

15. The information storage system of claim 14, in which the rings are a material such as aluminum that does not readily accept the magnetic material by electroplating.

* * * * *